(12) United States Patent
Wobben

(10) Patent No.: US 6,293,491 B1
(45) Date of Patent: Sep. 25, 2001

(54) VERTICAL TAKE-OFF AND LANDING AIRCRAFT

(76) Inventor: Aloys Wobben, Argenstrasse 19, 26607 Aurich (DE)

( * ) Notice: Subject to any disclaimer, the term of this patent is extended or adjusted under 35 U.S.C. 154(b) by 0 days.

(21) Appl. No.: 09/334,696

(22) Filed: Jun. 16, 1999

(51) Int. Cl.[7] ................................................ B64C 27/08
(52) U.S. Cl. ........................................ 244/17.23; 244/60
(58) Field of Search ................................... 244/26, 17.11, 244/17.23, 23 R, 23 A, 60, 55

(56) References Cited

U.S. PATENT DOCUMENTS

| | | | |
|---|---|---|---|
| 1,652,554 | * 12/1927 | Bolgiano | 244/17.23 |
| 3,061,242 | * 10/1962 | Zurawinski et al. | 244/23 A |
| 3,693,910 | * 9/1972 | Aldi | 244/7 A |
| 3,997,131 | * 12/1976 | Kling | 244/23 R |
| 4,554,989 | * 11/1985 | Gruich et al. | 244/60 |
| 4,709,882 | 12/1987 | Galbraith | 244/53 |
| 4,955,560 | 9/1990 | Nishina et al. | 244/53 |
| 4,979,698 | 12/1990 | Lederman | 244/7 |
| 5,971,320 | * 10/1999 | Jermyn et al. | 244/17.23 |

FOREIGN PATENT DOCUMENTS

| | | |
|---|---|---|
| 2234524 | 2/1973 | (DE) . |
| 26 28 274 | 1/1978 | (DE) . |
| 94 19 688.5 | 3/1995 | (DE) . |
| 253134 | * 3/1927 | (IT) ........... 244/26 |

OTHER PUBLICATIONS

R. Weisshart, "Fliegen ohne Flugplatz: Senkrechtstart", Soldat Und Technik Dec. 1964 pp. 668–692.

* cited by examiner

Primary Examiner—Galen L. Barefoot
(74) Attorney, Agent, or Firm—Christie, Parker & Hale, LLP

(57) ABSTRACT

The invention concerns a vertical take-off and landing aircraft (10) with a plurality of lift (26a–26p) and thrust rotors (20a,20b), in which all rotors have their own electric motor (48a–48p,50a,50b) as a drive.

11 Claims, 3 Drawing Sheets

VERTICAL TAKE-OFF AND LANDING AIRCRAFT

The invention concerns a vertical take-off and landing aircraft having a plurality of rotors for producing downthrust and drive thrust.

A vertical take-off and landing aircraft of that kind is distinguished in that for example like a helicopter it can take off and land vertically and fly like an airplane in horizontal flight, being then supported not by a lift rotor but by rigid airfoils.

Besides vertical take-off and landing jet-propelled aircraft with pivotable thrust and lift jets or an additional lift jet engine or both, aircraft are also known, which are referred to as tilt rotor aircraft which are equipped at the end of each of the airfoils with a respective rotor which can be pivoted together with the associated drive engine. In one pivotal position the rotors generate a downwardly directed lift thrust which permits the aircraft to take off and land vertically. In another pivotal position the rotors generate exclusively a thrust jet for producing forward propulsion while at the same time the lift required for the aircraft to fly is generated by the airfoils. A great disadvantage of an aircraft of that kind is that the demands which are made on the rotor when taking off and landing vertically are quite different from when the rotor is generating thrust for horizontal flight. For that reason the rotors of a tilt rotor aircraft are always the result of a compromise and do not provide for optimum fulfilment either of the task of generating forward propulsion for horizontal flight nor the task of generating lift in the vertical take-off and landing situation. Added to that is the difficult interplay of the power characteristics of the drive assemblies which often necessitate rotor blade adjustment and which also cannot be optimised without compromises being made, both in terms of horizontal flight and also for vertical take-off and landing.

The object of the present invention is thus to provide an alternative to the state of the art, which at least in part obviates the disadvantages thereof.

The object of the present invention is attained by a vertical take-off and landing aircraft comprising a plurality of lift and thrust rotors, wherein all rotors have their own electric motor as a drive.

An essential advantage of such an aircraft is that the individual electric motors can be operated and controlled in a simple fashion and over a wide power range quickly, reliably and with a high level of efficiency. That makes it possible to resolve the problem of power distribution to the individual lift and thrust rotors in a simple elegant fashion by suitable control of the electric motors. During vertical take-off and landing the lift rotors practically exclusively take shaft power, in the transition from vertical to horizontal flight both the lift rotors and the thrust rotors are then driven while in purely horizontal flight it is only the thrust rotors that are to be driven. It is therefore necessary for the available power to be suitably rapidly and flexibly distributed. That aspect also applies in regard to power distribution as among the individual lift and thrust rotors respectively. With the electric motors provided in accordance with the invention that power distribution effect is implemented by electrical power control substantially more easily than for example in the case of mechanical drives or by suitable control of individual internal combustion engines.

In comparison with internal combustion engines, electric motors not only enjoy the advantage that they are easier and faster to control but in addition in a practical situation they can also be designed for virtually any power range with a high level of efficiency and a good power-to-weight ratio. That permits particularly efficient implementation of the principle of a large number of rotors each having its own respective drive, wherein the drives are to be designed in accordance with the number of rotors only for affording a fraction of the total power to be produced. In addition a large number of small motors afford the advantage of enhanced overall fail-safety as the failure of only one cut of many rotors is less serious in terms of consequences than the failure of a single rotor or one out of two rotors. As moreover each electric motor in itself is substantially more reliable and substantially less susceptible to wear than an internal combustion engine, because of the small number of moving components, the aircraft enjoys substantially enhance overall reliability.

The use of many lift rotors which can be individually controlled by way of their respective drive motors finally affords very much more extensive options for flight control than hitherto.

In order to make full use of the great advantages which the invention offers in particular in terms of control of the individual drives a preferred aircraft provides that each electric motor has its own frequency converter connected upstream thereof. The frequency converters permit simple rapid control of the respective electric motors, with a high level of efficiency.

A preferred aircraft is one in which the frequency converters are connected to a dc power supply system or network. That dc power supply system is preferably fed by at least one internal combustion engine with a directly coupled generator. The advantage of such a concept is that the electrical energy required to power the electric drives does not have to be stored in batteries or accumulators, with a disadvantageous power-to-weight ratio, but can be carried on board in the form of internal combustion engine fuel which enjoys a particularly high level of energy density in relation to weight, and can be easily converted into electrical energy by means of one or more internal combustion engines and corresponding generators. In such an arrangement the internal combustion engines can be operated at a constant speed and in a relatively narrow power range as they do not serve for directly driving rotors but for generating power. In that way the internal combustion engines can be specifically designed for that operational situation and can be especially efficient.

In order further to enhance the fail-safe aspect of the overall system, a preferred aircraft provides for two dc power systems or networks for supplying power to the frequency converters, each being supplied by a respective internal combustion engine with generator and being connectable together.

Preferably the generators are polyphase current generators, with a rectifier connected at the output side of each thereof. Polyphase current generators have the advantage of affording a high level of efficiency and great reliability. The rectifiers connected on the output sides of the polyphase current generators feed the dc power supply or network with which the frequency converters are supplied. The frequency converters convert the direct current into a polyphase current again, but with a controllable frequency, in order in that way to control the speed or input power of the electric motors. Overall that arrangement affords a highly reliable and also very simple system, which affords rapid response, for power supply and power control for the individual drive motors.

Preferably the aircraft has sixteen lift rotors. On the one hand, that makes it possible to achieve a particularly large overall rotor area without for that purpose having to provide a single giant rotor with all the problems that this entails. The advantage of a large rotor area is that the power required to produce the necessary lift decreases with increasing rotor area. If the area covered by the rotors overall (referred to as the rotor area) is doubled, then the power required to generate a given lift is reduced for example by about 30%.

In addition, a large number of rotors which are each individually driven by a respective electric motor in conjunction with the above-described operating system for control of the electric motors affords the advantage that by individual control of the individual rotors, it is possible to achieve many different modes of lift distribution, for example to compensate for gusts of wind or for particular flight manoeuvres.

The lift rotors are preferably single-blade rotors. Single-blade rotors of that kind can be oriented in horizontal flight in positions such that the single rotor blade extends parallel to the direction of flight, like a windvane, and thus generates a particularly low level of air resistance. The lift rotors are preferably designed for a high high-speed index of for example $\lambda=8$. In that respect the above-mentioned index is the reciprocal of the coefficient of propeller advance which is frequently employed in propeller theory.

In order also to be able to provide for lateral thrust forces four lift rotors are preferably pivotable.

The aircraft also has preferably two thrust rotors. The thrust rotors are preferably multi-blade propellers, preferably having between eight and twelve propeller blades.

The thrust rotors are preferably designed for a high-speed index of $\lambda=1-2$. The propeller blades also preferably have a fixed blade pitch angle. A fixed pitch angle is possible by virtue of the properties of the driving electric motors as they have a high level of efficiency over a wide speed range. The structure of the thrust rotors can be considerably simplified by omitting the pitch adjustment mechanism.

As the thrust rotors and the lift rotors are independent of each other, they can each be designed in the optimum fashion in accordance with the respective purpose thereof. Thus affording a high level of efficiency for the overall system.

The present invention will now be described in greater detail by means of an embodiment with reference to the accompanying drawing in which.

Figure 1:
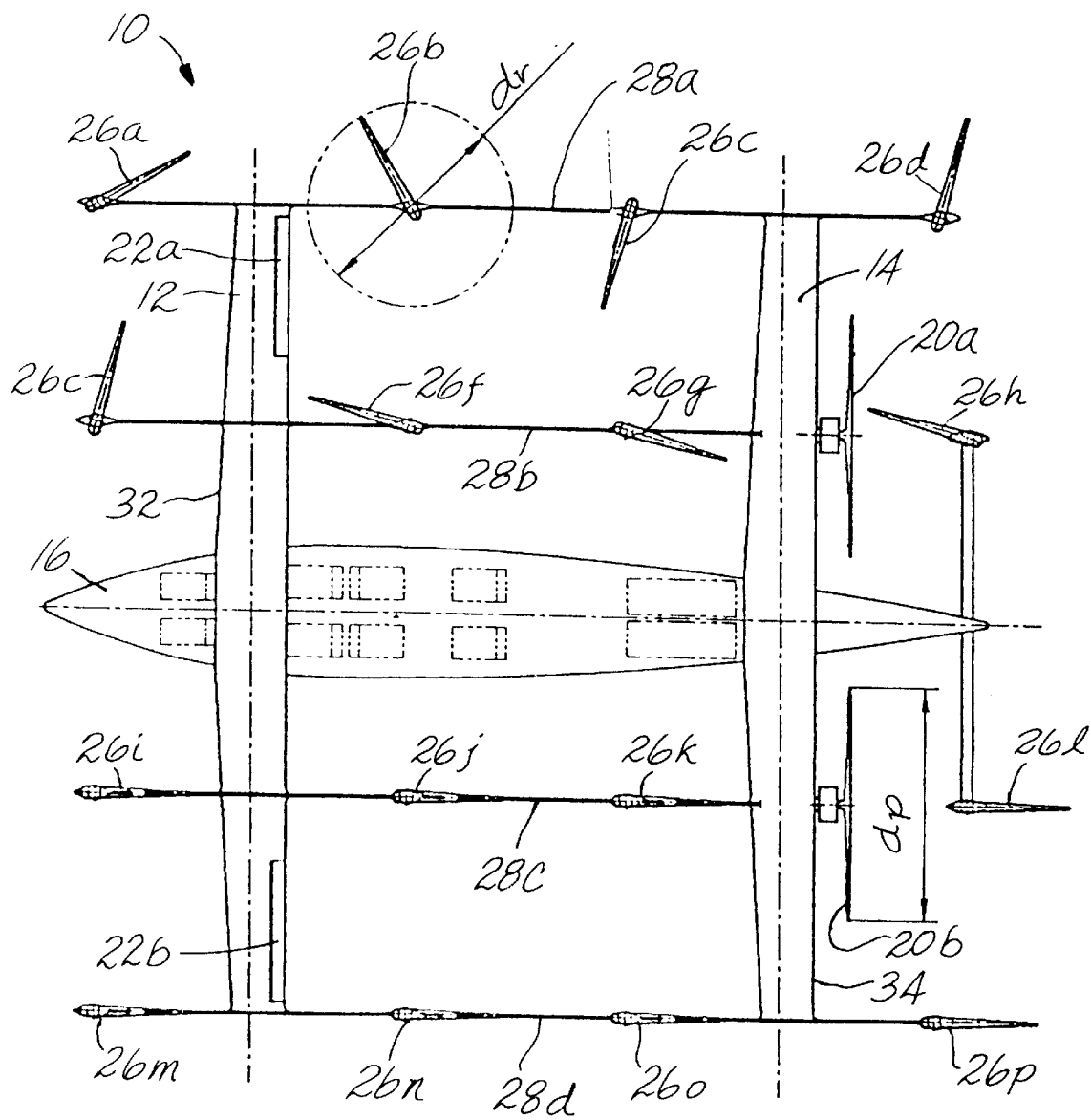
FIG. 1 is a plan view of the aircraft in accordance with the invention.

The vertical take-off and landing aircraft 10 shown in FIG. 1 is a tandem fixed-wing aircraft, that is to say, the aircraft has two airfoils 12 and 14 of at least approximately equal size which both contribute to generating lift. The two airfoils 12 and 14 are disposed one behind the other on a fuselage 16 in staggered relationship. In the illustrated arrangement therefore the front airfoil 12 is disposed in the proximity of the nose of the fuselage 16 while the rear airfoil 14 is disposed in the proximity of the tail of the fuselage 16.

Figure 2:
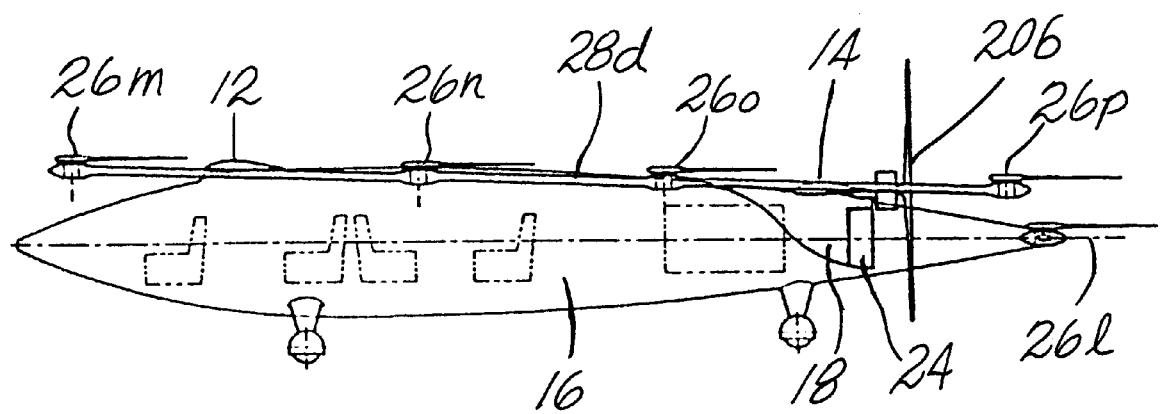
FIG. 2 is a side view of the aircraft according to the invention.

The side view in FIG. 2 shows that the two airfoils 12 and 14 are mounted to the top side of the fuselage. The vertical take-off and landing aircraft 10 is therefore a high-wing aircraft. The side view also shows a lateral fin or vertical stabiliser 18. In actual fact the aircraft 10 has two lateral fins 18 at both sides of the fuselage 16.

The aircraft 10 has two thrust propellers 20a and 20b which are mounted on the rear airfoil 14. The thrust propellers 20a and 20b are in the form of multi-blade propellers, that is to say each have between eight and twelve propeller blades. The propeller blades have a fixed mechanical blade or pitch angle and are designed with a low high-speed index of about $\lambda=1-2$. That index is the reciprocal of the coefficient of propeller advance which is often referred to in propeller theory.

Each of the thrust propellers 20a and 20b is driven by its own respective electric motor. As the propellers have a fixed mechanical pitch angle and are therefore operated without pitch adjustment, adaptation to different flight speeds is implemented by varying the speed of rotation. In that respect, the propeller speed of rotation is linearly increased with increasing speed of travel.

A combined aileron and elevator respectively are provided at each of the two sides of the fuselage, on the front airfoil 12, to control horizontal flight of the aircraft. If those combined aileron and elevators 22a and 22b are deflected in opposite directions, they serve to control banking of the aircraft 10 during horizontal flight. If in contrast the combined aileron and elevators 22a and 22b are deflected in the same direction, they serve as elevators and thus operate to control the longitudinal inclination or pitch of the aircraft 10 during horizontal flight.

The lateral fins 18 produce the required directional stability about a vertical axis and are also provided with side rudders 24 for controlling the yaw angle of the aircraft 10 in horizontal flight.

In the illustrated embodiment the aircraft 10 has a wingspan of 12 meters. The fuselage 16 is just on 14 meters in length and the aerofoils 12 and 14 are displaced by 7.80 meters relative to each other in the longitudinal direction of the fuselage 16. The propellers 20a and 20b are of a diameter as indicated at dp of 3.50 m.

In order to be able to take off and land vertically the aircraft 10 has a total of 16 rotors 26a–26p. All the lift rotors are identical in the form of a single-blade rotor, with a high index $\lambda$ of about 8. They are in the shape of a slender sword blade. Each of the lift rotors 26 is driven by its own electric motor. The electric motors are each directly mounted to the shaft of the lift rotor. The lift rotors 26 are supported on a total of four narrow longitudinal bearers 28a–28d and two cantilever bearers 30a and 30b. All the longitudinal bearers 28a–28d extend between the two aerofoils 12 and 14 parallel to the fuselage 16. In that arrangement the two outer longitudinal bearers 28a and 28d are each mounted completely at the outer ends on the airfoils 12 and 14 and project both forward beyond the leading edge 32 of the front airfoil 12 and rearwardly beyond the trailing edge 34 of the rear airfoil 14. The two inner longitudinal bearers 28b and 28c in contrast only project forwardly beyond the leading edge 32 of the front airfoil 12. Disposed in line with the rear ends of the inner bearers 28b and 28c are the shafts of the propellers 20a and 20b with their respective drives. The two cantilever bearers 30a and 30b are mounted to the tail end portion of the fuselage 16 and extend outwardly transversely with respect to the longitudinal direction thereof. At their outer ends they each carry a respective lift rotor 26h and 26l respectively.

The other lift rotors are mounted to the bearers 28a–28d, more specifically with four of the lift rotors 26a–26d and 26m–26p respectively mounted to each of the outer bearers 28a and 28d, and three of the lift rotors 26i–26g and 26l–26k to each of the two inner longitudinal bearers 28b and 28c. Overall the lift rotors 26 are distributed on the longitudinal bearers 28 and the cantilever bearers 30 in such a way that they are all approximately at the same spacing from each other and the downdraft produced thereby when taking off and landing is beside the airfoils 12 and 14.

The four outer lift rotors 26*a*, 26*d*, 26*m* and 26*p* are mounted pivotably about the longitudinal direction of the longitudinal bearers 28*a* and 28*d* so that by suitable pivotal movement they can also generate laterally directed thrust components.

Each lift rotor 26 is of a diameter $d_r$ of 3 meters and thus defines a rotor area of somewhat more than 7 m². The total area thus covered by all sixteen lift rotors 26 is somewhat more than 113 m².

The lift rotors 26 are so designed that in vertical flight they permit a rate of climb of between 8 and 9 m/s. That means that a flying height of 100 meters can be reached in about 12 seconds.

The single-blade lift rotors 26 are not required in horizontal flight. They are then positioned in such a way as to be oriented parallel to the longitudinal bearers 28*a*–28*d*, so that the rotor blade is positioned like a windvane in the slipstream direction. The resistance produced by the lift rotors 26 is therefore very low in horizontal flight.

The aircraft 10 is designed for a speed of travel in horizontal flight of about 400 kph. That means that the speed of the aircraft in horizontal flight is about thirteen times higher than when climbing and descending vertically. That means that different demands are made on the lift and thrust rotors involved, and account is taken thereof in the above-described manner.

Figure 3:
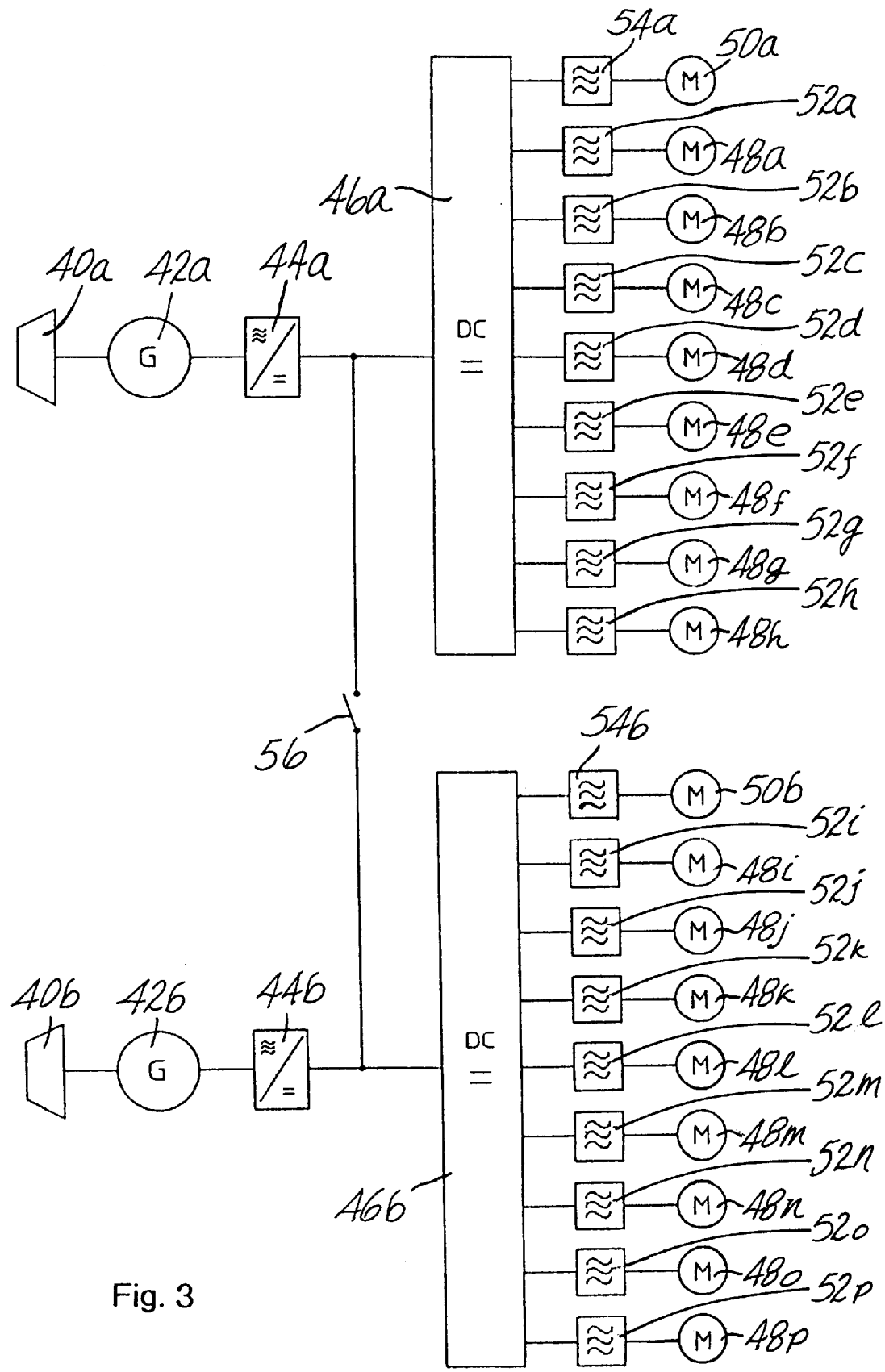
FIG. 3 is a circuit diagram illustrating the drive concept.

FIG. 3 now shows the drive and control concept for the aircraft 10. Disposed in the tail portion of the aircraft fuselage 16 are two internal combustion engines 40*a* and 40*b* (FIGS. 1 and 2). A respective polyphase current generator 42*a* and 42*b* is directly coupled to each of the internal combustion engines 40*a* and 40*b*. Connected on the output side of each of the generators 42*a* and 42*b* is a respective rectifier 44*a* and 44*b* for converting the polyphase current generated by the generators 42*a* and 42*b* into a direct current. The direct current produced in that way is distributed by way of respective dc power supply systems or networks 46*a* and 46*b* respectively to the lift and thrust rotor drives on respective sides of the aircraft. In that respect, each lift or thrust drive comprises a respective electric motor 48*a*–48*p* and 50*a* and 50*b*. Associated with each of the electric motors 48 and 50 is its own frequency converter 52*a*–52*p*, 54*a* and 54*b* which is fed from the dc system 46*a* or 46*b* respectively. The individual motors 48*a*–48*p*, 50*a* and 50*b* can be very rapidly and accurately regulated by means of the frequency converters 52*a*–52*p*, 54*a* and 54*b* respectively.

Normally each internal combustion engine 40*a* and 40*b*, by way of the respective polyphase current generators 42*a* and 42*b* connected thereto and the rectifiers 44*a* and 44*b*, feeds power to the dc power supply system 46*a* and 46*b* on a respective side, with which the drives disposed on that side are to be powered. The dc power supply systems 46*a* and 46*b* at each side of the aircraft and the internal combustion engines 40*a* and 40*b* respectively associated therewith thus operate completely independently of each other. A switch 56 provides that the two dc power supply systems 46*a* and 46*b* can however be connected together so that, in the event of failure of one of the internal combustion engines 40*a* or 40*b*. The two power supply systems can be supplied with power together by the other internal combustion engine 40*a* or 40*b*.

Individual actuation and control of each of the drives affords overall a highly flexible system for flight control purposes, with which the aircraft 10 can be readily held in a horizontal position during vertical take-off and landing as disturbances due to wind gusts or variations in weight can be quickly compensated by suitable regulation. If during the take-off phase side winds occur from the front or the rear, which could influence the position of the hovering aircraft, a suitable counteracting force can then be generated by means of the thrust propellers. For that purpose the direction of thrust force thereof can be altered by reversing the direction of rotation.

To increase the safety level it is also possible to provide an accumulator (chargeable battery) by means of which at least the electrical energy required for the aircraft to land can be made available. That accumulator, preferably a dc accumulator, is connected to the dc power supply and takes over supplying power to the power supply systems in the event of failure of both generator arrangements, which is highly improbable.

At the same time in normal operation the accumulator also serves to supply electrical energy to other items of equipment in the aircraft, for example control units and assemblies. The aircraft can also be provided with a power management system for the accumulator (not shown) for controlling charging of the accumulator by the supply of electrical energy from the generator or one of the rectifiers.

What is claimed is:

1. A vertical takeoff and landing aircraft comprising a plurality of lift and thrust rotors each with its own respective electric motor as a drive wherein each electric motor has its own respective frequency converter connected upstream thereof and wherein the frequency converters are connected to dc systems for supplying power to the frequency converters which are supplied by a respective internal combustion engine with a generator and can be connected together.

2. The vertical take-off and landing aircraft of claim 1, wherein the generators are polyphase generators each of which has a rectifier on an output side of the generator.

3. The vertical take-off and landing aircraft of claim 1, wherein each lift rotor is a single blade rotor.

4. The vertical take-off and landing aircraft of claim 1, wherein at least four of the lift rotors are pivotable about an axis parallel to the longitudinal axis of the aircraft.

5. A vertical take-off and landing aircraft comprising:
   at least one internal combustion engine;
   at least one polyphase electric current generator driven by each internal combustion engine;
   at least one rectifier connected to each polyphase current generator for converting the polyphase current to direct current;
   at least one direct current power distribution network, wherein the network receives current from the rectifier for distribution;
   a plurality of single blade lift rotors and multi-blade thrust rotors;
   one electric motor directly coupled to each of the lift and thrust rotors;
   one frequency converter directly coupled to each electric motor, wherein each frequency converter controls the speed of its respective motor; and
   the direct current power distribution networks supplying current to each electric motor via the frequency converters.

6. The vertical take-off and landing aircraft of claim 5, wherein at least four of the lift rotors are pivotable about an axis parallel to the longitudinal axis of the aircraft.

7. A vertical take-off and landing aircraft comprising:
   two direct current power sources, each source comprising:
      an internal combustion engine;
      a polyphase current generator driven by the internal combustion engine;

a rectifier connected to the generator for converting polyphase current to direct current;

two direct current distribution networks, each network receiving power from one of the direct current power sources;

the distribution networks being switchable between the power sources, wherein if one power source fails both distribution networks may be driven by the remaining power source;

each distribution network driving a plurality of electric motors, via frequency converters;

each electric motor being directly coupled to a rotor.

8. The vertical take-off and landing aircraft of claim 7, wherein each rotor is selected from the group consisting of lift and thrust rotors.

9. The vertical take-off and landing aircraft of claim 7, wherein each lift rotor is a single blade rotor.

10. The vertical take-off and landing aircraft of claim 7, wherein each thrust rotor is a multi-blade rotor.

11. The vertical take-off and landing aircraft of claim 7, wherein at least four of the lift rotors are pivotable about an axis parallel to the longitudinal axis of the aircraft.

* * * * *